(12) United States Patent
Coult et al.

(10) Patent No.: US 6,490,033 B1
(45) Date of Patent: Dec. 3, 2002

(54) METHOD OF THIN FILM PROCESS CONTROL AND CALIBRATION STANDARD FOR OPTICAL PROFILOMETRY STEP HEIGHT MEASUREMENT

(75) Inventors: David Gerald Coult, Bechtelsville, PA (US); Gustav Edward Derkits, Jr., New Providence, NJ (US); Franklin Roy Dietz, Mohnton, PA (US); Ranjani C. Muthiah, Upper Macungie Township, PA (US); Sonja Radelow, Escondido, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/478,149

(22) Filed: Jan. 5, 2000

(51) Int. Cl.$^7$ .................................................. G01J 1/10
(52) U.S. Cl. ............................. 356/243.1; 356/243.4; 356/243.7; 356/503
(58) Field of Search .............................. 356/503, 498, 356/505, 509, 511, 516, 243, 243.1–243.8

(56) References Cited

U.S. PATENT DOCUMENTS 5,502,566 A    3/1996  Ai et al. ....................... 356/359
5,665,905 A    9/1997  Bartha et al. ................... 73/105

OTHER PUBLICATIONS

Candela et al., SPIE, Optical Testing and Metrology, 1986; 661:402–407.

Hatsuzawa et al., Proc. IEEE Int. Conference on Microelectronic Test Structures, 1992; 5:180–184.

Ohmi et al., Appl. Phys. Lett., 1992; 61(20):2479–2481.

Primary Examiner—Robert H. Kim
Assistant Examiner—George Wang
(74) Attorney, Agent, or Firm—Darby & Darby

(57) ABSTRACT

A method of calibrating an interferometer system and a multilayer thin film used for calibrating the interferometer system. The method including measuring the step height of a gold step with the interferometer system, the multilayer thin film comprising a gold layer that defines the gold step. The multilayer thin film having an optical flat, a first layer on the surface of the optical flat, a second layer on the first layer, a test layer on a part of the second layer, and a gold layer on the test layer and on a part of the second layer uncovered by the test layer. The test layer having a test layer step, and the gold layer having a gold step over the test layer step. Also, a reference standard and a method of making the reference standard for a thin film sample with one or more component thin film layers, the reference standard having a gold layer over the surface of the thin film sample.

24 Claims, 2 Drawing Sheets

METHOD OF THIN FILM PROCESS CONTROL AND CALIBRATION STANDARD FOR OPTICAL PROFILOMETRY STEP HEIGHT MEASUREMENT

FIELD OF THE INVENTION

The invention relates generally to thin films and the interference microscope and specifically to techniques for calibrating an optical profilometer and for measuring a thin film surface profile.

BACKGROUND OF THE INVENTION

Optical profilometry is a non-contact method of measuring the surface characteristics of a thin film sample in three dimensions. Optical profilometry is often preferred to contact methods, such as atomic force microscopy and surface contact profilometry, because the latter are intrinsically less accurate and can destroy features of the sample during measurement.

An optical profilometer is one type of interference microscope (interferometer). An interference microscope generally is used either to measure or to visualize the phase differences between two or more beams of electromagnetic radiation, when directed to a thin film it measures the surface features of the thin film sample under investigation. When the microscope measures the phase differences, it generates an interference pattern which a computer can analyze to derive a surface profile of the sample. The microscope and computer together comprise an interferometer system.

Several beams of the radiation used to measure surface features of a thin film may penetrate slightly beneath the surface of the thin film before they are scattered. This penetration depth changes the distance traveled by a beam and may affect the phase difference between the beam and another beam with which it interferes, creating noise in the interference pattern and decreasing the accuracy of the measurement. The noise becomes more significant when the profilometer is used to measure thin film step heights that fall below 10 nanometers, because at this height the penetration depth is on the same order of magnitude as the step height. If radiation with a smaller wavelength and higher energy is used, the noise becomes even greater because this radiation penetrates even deeper into the thin film. Moreover, the smaller the wavelength, the more dramatically a slight difference in the path traveled by the radiation affects the resulting phase difference as well as the interference pattern.

The penetration depth of the beam introduces additional inaccuracies into the process of calibrating the optical profilometer, especially when the profilometer must be calibrated for taking measurements of thin film step heights in the sub-10 nanometer range. Previously the best technique of calibration for these step heights was to calibrate to a much higher step and then extrapolate blindly to a step that is an order of magnitude lower. Alternately, a contacting measuring method might have been used instead of non-contact optical profilometry.

Unfortunately, the technique of calibrating to a higher step may yield imprecise measurements. Alternately, contacting measuring methods may damage the surface features of a thin film sample. Further, these methods are generally less accurate and may be more costly.

Another drawback of measuring a step height with an optical profilometer arises when the step does not have an identical composition in its upper and next lower levels. In particular, if the upper level of the step comprises one metal with one penetration depth while the next lower level comprises a different metal with a different penetration depth, the step might create even more noise in the interference pattern.

SUMMARY OF THE INVENTION

Accordingly, an object of one embodiment of the invention is to provide a technique for calibrating an optical profilometer to measure very small step heights. Another object of an embodiment of the invention is to provide a calibration standard for optical profilometry step height measurements. Another object of an embodiment of the invention is to provide a technique for measuring very small step heights. Another object of an embodiment of the invention is to provide a reference standard for thin film process control.

Briefly described, and in accordance with one embodiment thereof, the invention provides a method of calibrating an interferometer system including measuring the step height of a gold step with the interferometer system. The gold step is in a gold layer of a multilayer thin film which acts as a calibration standard. The multilayer thin film (calibration standard) has an optical flat, a first layer on the surface of the optical flat, a second layer on the first layer, a test layer on a part of the second layer, and a gold layer on the test layer and on a part of the second layer uncovered by the test layer. The test layer has a test layer step, and the gold layer has the gold step over the test layer step. The gold step is equivalent in height to the test layer step and exhibits a lower penetration depth than the test layer step beneath it. The gold step also has a uniform (gold) composition in its upper level and next lower level.

In accordance with another embodiment thereof, the invention provides a calibration standard for optical profilometry step height measurements. The calibration standard has a multilayer structure comprising an optical flat, a first layer on the surface of the optical flat, a second layer on the first layer, a test layer on a part of the second layer, and a gold layer on the test layer and on a part of the second layer uncovered by the test layer. The test layer has a test layer step, and the gold layer has a gold step over the test layer step.

In accordance with another embodiment thereof, the invention provides a method of making a reference standard for a thin film sample with one or more component thin film layers. The method includes depositing a layer of gold over the surface of the thin film sample.

In accordance with another embodiment thereof, the invention provides a reference standard for a thin film sample with one or more component thin film layers. The reference standard has a layer of gold that is measured by the profilometer, but is otherwise essentially the same as the thin film sample.

BRIEF DESCRIPTION OF THE DRAWINGS

The foregoing and other features of the invention will be described in more detail in the following Detailed Description of the Preferred Embodiment, taken in conjunction with the accompanying drawings wherein.

DETAILED DESCRIPTION OF THE PREFERRED EMBODIMENTS

Figure 1:
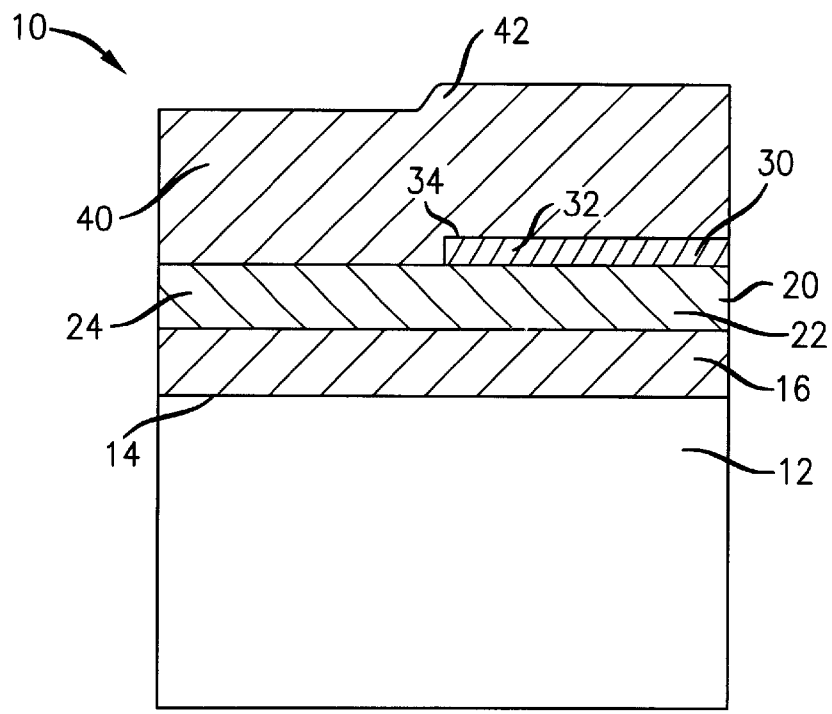
FIG. 1 is a cross-sectional view showing the multilayer structure of the first embodiment of the invention.

FIG. 1 shows a first embodiment of the invention. A multilayer thin film 10, used to calibrate an interferometer system, has an optical flat 12 preferably with a λ/20 smooth surface 14 of amorphous material. On the optical flat 12 is a first layer 16 which adheres strongly to the surface 14 of the optical flat 12. On the first layer 16 there is a second layer 20 which adheres strongly to the first layer 16. The second layer 20 has a first part 22 and a second part 24 that are generally coplanar with each other and adjacent to each other. On the first part 22 of the second layer 20 there is a test layer 30 which adheres strongly to the first part 22 of the second layer 20. A gold layer 40 is located both on the second part 24 of the second layer 20, and on the test layer 30.

The test layer 30 defines a test layer step 32, with a height of a generally known value, at the boundary 34 of the test layer 30. The gold layer 40 defines a gold step 42 over the test layer step 32. The gold step 42 is equivalent in height to the test layer step 32. The interferometer system is calibrated by measuring the height of the gold step 42 several times with the interferometer system, and then calculating the mean value, median value, and standard deviation of the measurements.

Figure 2:
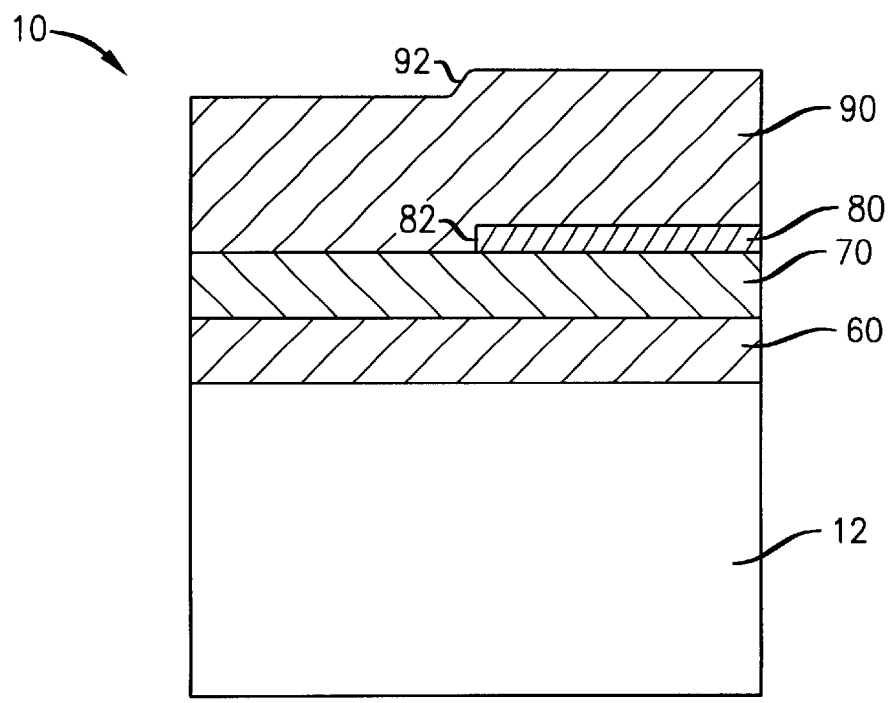
FIG. 2 is a cross-sectional view showing the multilayer structure of another embodiment of the invention.

FIG. 2 shows another embodiment of the invention. A multilayer thin film 50, which is located on optical flat 12, comprises a first layer 60 with a thickness of about 30 nm or less, a second layer 70 with a thickness of about 30 nm or less, a test layer 80, and a gold layer 90 with a thickness of about 50 nm or less. The test layer 80 creates a step 82 which is reflected in the gold layer 90 as step 92. A particular example of the multilayer thin film 50 has a first layer 60 of titanium with a thickness of 20 nm, a second layer 70 of platinum with a thickness of 20 nm, a test layer 80 of platinum with a thickness of 6 nm, and a gold layer 90 with a thickness of 50 nm. A multilayer thin film with this construction can act as a calibration standard for calibrating an interferometer system.

Figure 3:
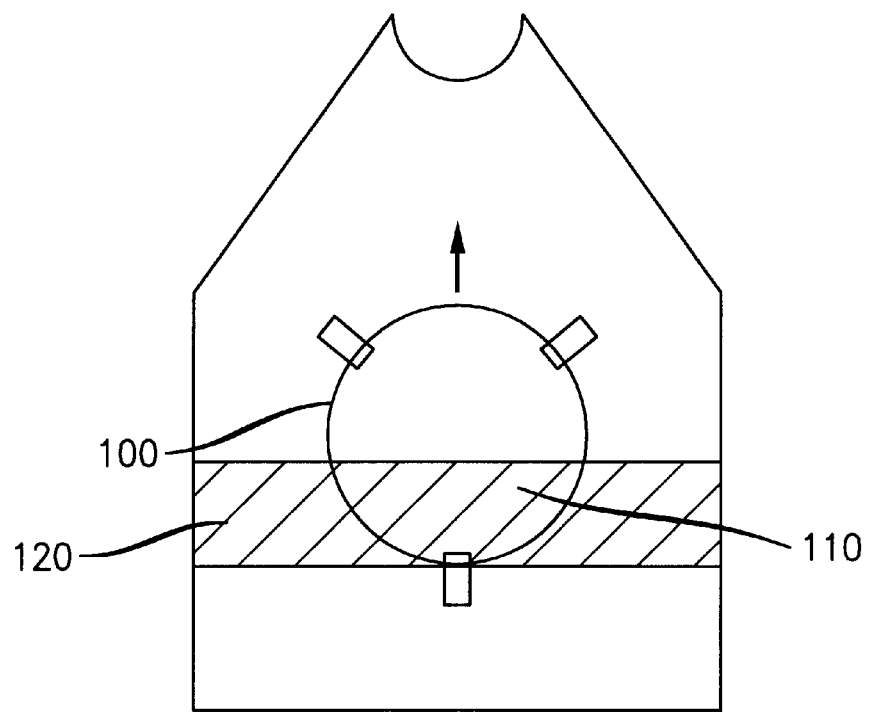
FIG. 3 is a top view illustrating the process of preparing the multilayer thin film of the invention.

A multilayer thin film sample with the foregoing construction is formed first by depositing a titanium and platinum bilayer on the optical flat 12. The sample is then removed from a thin film depositing system. As shown in FIG. 3, half 110 of the sample 100 is then masked with aluminum foil 120 before the sample 100 is reloaded into the depositing system for depositing a test layer of platinum thereon. The sample 100 is then once again removed from the depositing system, the aluminum foil 120 is removed from the sample, and the sample 100 is reloaded into the depositing system for depositing a gold layer thereon.

Figure 4:
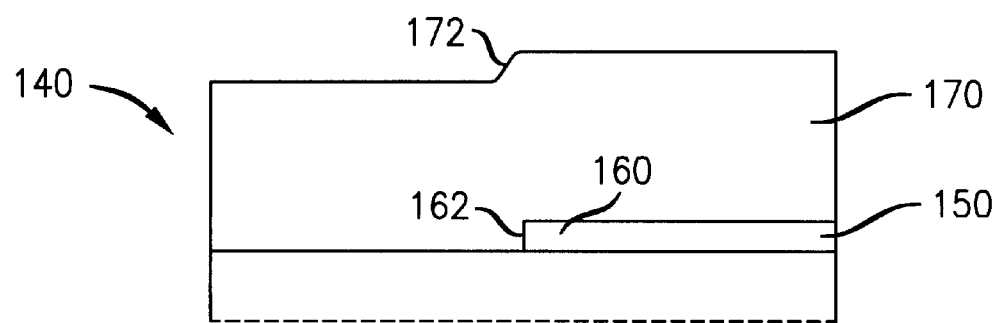
FIG. 4 is a cross-sectional view showing the structure of the reference standard of another embodiment of the invention.

FIG. 4 shows another embodiment of the invention, a reference standard 140 for a thin film sample with one or more component thin film layers. The thin film sample has a surface 150 upon which is deposited a test layer 160 that defines a step 162. The reference standard 140 comprises a gold layer 170 on the surface 150 of the thin film sample, which as a result of step 162 creates a step 172. Because gold has a small known beam penetration, and the top and bottom of the steps 42 (FIG. 1), 92 (FIG. 2) and 172 (FIG. 4) are of gold, these structures can be used as accurate calibration standards for an interferometer (profilometer) system. These structures provide accuracy for steps which are at least 10 nanometers or less. The gold layer 170 may have a thickness no greater than 50 nm.

While the foregoing embodiments of the present invention have been set forth in considerable detail for the purposes of making a complete disclosure of the invention, it should be apparent to those of skill in the art that numerous changes may be made in such detail without departing from the spirit and principles of the invention.

What is claimed is:

1. A method of calibrating an interferometer system comprising: measuring the height of a gold step with the interferometer system, the gold step being in a gold layer of a multilayer thin film for use as a calibration standard, the multilayer thin film comprising:

an optical flat;

a first layer on the surface of the optical flat;

a second layer on the first layer, the second layer having a first part and a second part;

a test layer on the first part of the second layer, the test layer having a test layer step; and, a gold layer on the test layer and on the second part of the second layer, such that the gold layer has said gold step over said test layer step.

2. The method of claim 1 wherein the first layer has a thickness of 50 nm or less, the second layer has a thickness of 50 nm or less, and the gold layer has a thickness between 15nm and 65 nm.

3. The method of claim 2 wherein the first layer has a thickness of about 30 nm or less, the second layer has a thickness of about 30 nm or less, and the gold layer has a thickness between about 30 nm and about 50 nm.

4. The method of claim 3 wherein the optical flat has a λ/20 smooth surface of amorphous material.

5. The method of claim 1 wherein the first layer is titanium with a thickness of about 20 nm, the second layer is platinum with a thickness of about 20 nm, the test layer is platinum with a thickness of about 6 nm, and the gold layer has a thickness of about 50 nm.

6. The method of claim 5 wherein the optical flat has a λ/20 smooth surface of amorphous material.

7. The method of claim 1 wherein two or more measurements of the step height of the calibration standard are taken with the interferometer system for calibrating the interferometer system.

8. A multilayer thin film for use in calibrating an interferometer system comprising:

a. a first layer on the surface of an optical flat;

b. a second layer on the first layer, the second layer having a first part and a second part;

c. a test layer on the first part of the second layer, the test layer having a step; and, d. a layer of gold on the test layer and on the second part of the second layer, so that the layer of gold has a step over the step in the test layer.

9. The multilayer thin film of claim 8 wherein the first layer has a thickness of 50 nm or less, the second layer has a thickness of 50 nm or less, and the gold layer has a thickness between 15 nm and 65 nm.

10. The multilayer thin film of claim 9 wherein the first layer has a thickness of about 30 nm or less, the second layer has a thickness of about 30 nm or less, and the gold layer has a thickness between about 30 nm and about 50 nm.

11. The multilayer thin film of claim 10 wherein the optical flat has a λ/20 smooth surface of amorphous material.

12. The multilayer thin film of claim 8 wherein the first layer is titanium with a thickness of about 20 nm, the second layer is platinum with a thickness of about 20 nm, the test layer is platinum with a thickness of about 6 nm, and the gold layer has a thickness of about 50 nm.

13. The multilayer thin film of claim 12 wherein the optical flat has a λ/20 smooth surface of amorphous material.

14. A method of making a multilayer thin film for use in calibrating an interferometer system comprising:

a. depositing a first layer on the surface of an optical flat;

b. depositing a second layer on the first layer, the second layer having a first part and a second part;

c. depositing a test layer on the first part of the second layer, the second layer having a step; and, d. depositing a layer of gold on the test layer and on the second part of the second layer, so that the layer of gold has a step over the step in the test layer.

15. The method of claim 14 wherein the first layer has a thickness of 50 nm or less, the second layer has a thickness of 50 nm or less, and the gold layer has a thickness between 15 nm and 65 nm.

16. The method of claim 15 wherein the first layer has a thickness of about 30 nm or less, the second layer has a thickness of about 30 nm or less, and the gold layer has a thickness between about 30 nm and about 50 nm.

17. The method of claim 16 wherein the optical flat has a λ/20 smooth surface of amorphous material.

18. The method of claim 14 wherein the first layer is titanium with a thickness of about 20 nm, the second layer is platinum with a thickness of about 20 nm, the test layer is platinum with a thickness of about 6 nm, and the gold layer has a thickness of about 50 nm.

19. The method of claim 18 wherein the optical flat has a λ/20 smooth surface of amorphous material.

20. A method of making a reference standard for a thin film sample with one or more component thin film layers, the thin film sample having a surface, the surface defining a step with a step height, the method comprising depositing a layer of gold on the surface of the thin film sample.

21. The method of claim 20 wherein the gold layer has a thickness between about 30 nm and about 50 nm.

22. The method of claim 20 wherein two or more measurements are taken with the interferometer system for obtaining a mean value of the height of the step.

23. A reference standard for use in thin film process control, the standard comprising a layer of gold deposited on the surface of a thin film sample in manufacture for measurement by an interferometer system.

24. The reference standard of claim 23 wherein the gold has a thickness between about 30 nm and about 50 nm.

\* \* \* \* \*